July 2, 1946.  W. A. SMITH  2,403,131
LAMINATED CONTAINER CLOSURE
Filed Aug. 10, 1942  2 Sheets-Sheet 1
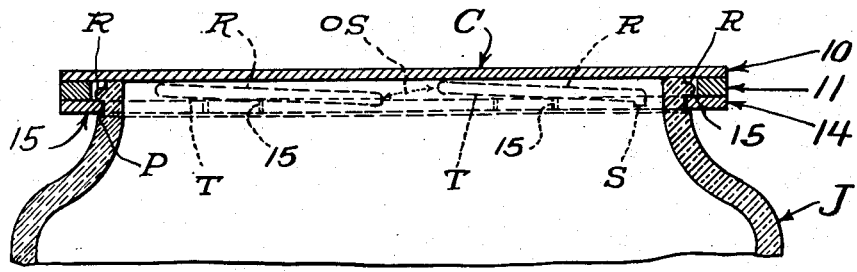
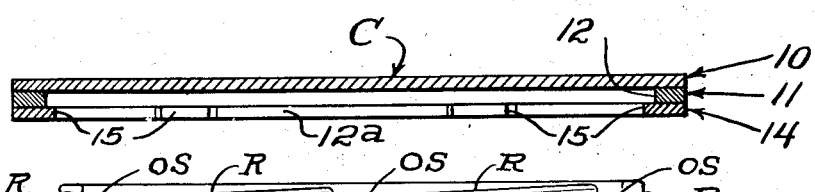
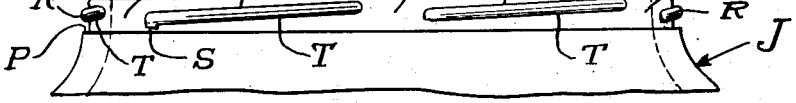
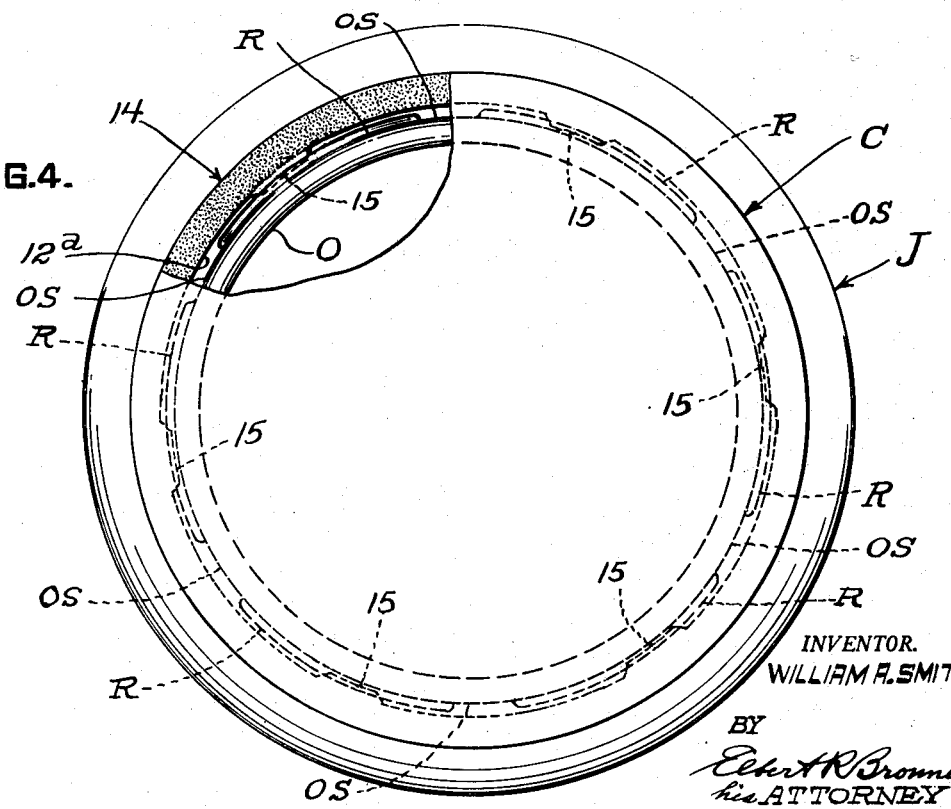
INVENTOR.
WILLIAM A. SMITH,
BY
his ATTORNEY July 2, 1946.  W. A. SMITH  2,403,131
LAMINATED CONTAINER CLOSURE
Filed Aug. 10, 1942  2 Sheets-Sheet 2
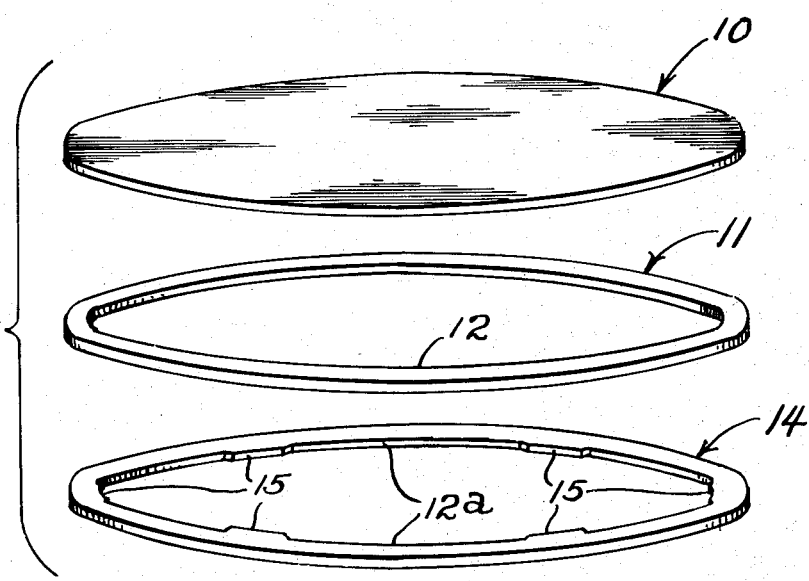
FIG.5.
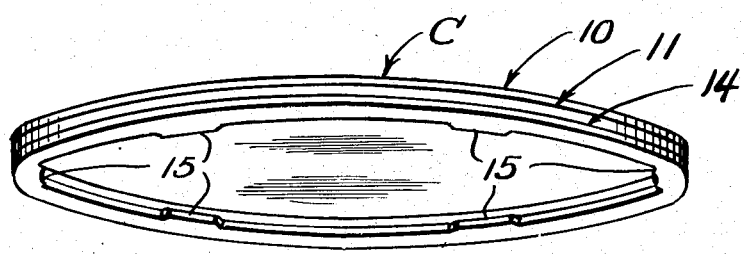
FIG.6.
FIG.7.
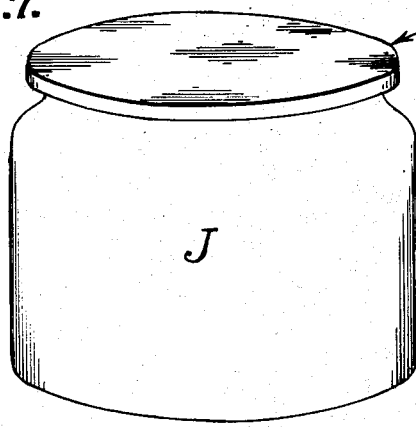
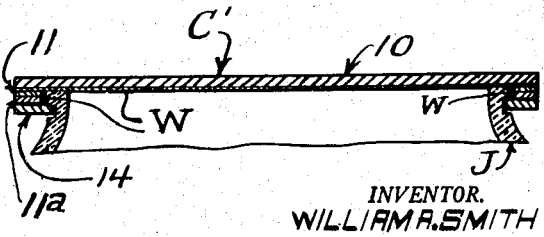
FIG.8.
INVENTOR.
WILLIAM A. SMITH
BY
Robert R Bronner
his ATTORNEY.

Patented July 2, 1946

2,403,131

UNITED STATES PATENT OFFICE 2,403,131

LAMINATED CONTAINER CLOSURE

William A. Smith, Bronxville, N. Y., assignor to F. N. Burt Company, Inc., Buffalo, N. Y., a corporation of Delaware Application August 10, 1942, Serial No. 454,336

5 Claims. (Cl. 215—44)

1

This invention relates to non-metallic caps or closures for containers, particularly for glass jars containing tobacco, candy or similar dry materials or liquid products such as preserves, and the like.

One of the salient features of this invention is the laminated structure of the cap, the top layer providing the covering or closure, the intermediate layer or layers providing the shims or spacers, and the bottom layers having rigid tabs that engage corresponding spaced ridges on the jar, so the cap may be instantly interlocked thereon.

Another salient feature of this invention is the variable finish that may be provided to cover over the layers of pressed paper-board, fibre or kraft-board, or other similar material, thereby simulating a one piece cap member.

Another feature of this invention, is providing a non-metallic cap with means to make it airtight and water-proof, such for example, as by waxed paper, or coating of any suitable character to make impervious the inner portion of the cap or closure member, after which the exterior portion may have any suitable label, printing or advertisement, in any colors desired.

Other objects and features of the invention will be in part pointed out in the following detailed description of certain illustrative embodiments thereof, and will be in part obvious as the description proceeds.

The invention accordingly comprises the features of construction, combination of elements, and arrangement of parts, which will be exemplified in the construction hereinafter set forth and the scope of the application of which will be indicated in the claims.

For a more complete disclosure of the nature, objects and advantages of the invention, reference is had to the following detailed description of the illustrative embodiments and to the accompanying drawings in which:

Figure 1 is an elevational and sectional view of the cap or closure member of this invention, which is shown in its secured position on a glass jar.

Figure 2 is a similar sectional view of the cap or closure member by itself.

Figure 3 is an elevational view of the upper neck portion of the glass jar, showing the locking ridges that secure the cap member thereto.

Figure 4 is a plan view of Figure 1, the top cover and layer member being broken away for the purpose of illustration.

Figure 5 is an exploded perspective view showing the laminations or layers of the cap member.

Figure 6 is an underside perspective view of the assembled cap member, before the final exterior treatment.

Figure 7 is a perspective view on a reduced scale showing the laminated non-metallic cap member of this invention secured onto the glass jar.

Figure 8 is a sectional view on a reduced scale similar to Figure 1, in which the under surface of the top laminated layer is coated with wax, or is provided with a separate waxed paper gasket, thereby sealing the jar in air-tight condition.

Referring to the drawings, particularly to Figure 5, the numeral 10 designates the top layer or cover member, which is a solid and full disklike piece of pressed paper-board, fibre or kraftboard, or of any other similar tough non-metallic material. An intermediate layer or flat ring member 11 of the same material and the same outside diameter as the top layer 10, has an inner circular opening 12. The bottom layer 14 is a flat ring member similar to the member 11, but it has projecting rigid-tab portions 15 suitably spaced apart as shown around the inner circular opening 12a. The rigid tabs 15 as shown are preferably integral with the inner edge portion of the flat ring 14.

All of the layers 10, 11 and 14 are assembled into a cap or laminated closure member C, clearly shown in Figures 1 and 2, being secured together such as by means of glue or cement applied on the layer surfaces and portions contacting each other. The laminated structure may be finished as desired, such as by spraying means in any desired finish or color, by which the layers are concealed, and are made water and air-tight, whereby the appearance of a solid cap member is simulated, as shown in Figure 7.

The cap member C is adapted to be attached and secured onto a container, such as a glass jar J, having a short neck and mouth portion with a very large opening O slightly smaller than the jar itself. Projecting inclining ridges R are suitably spaced apart as indicated at OS and are provided with stops S, as shown in Figures 1 to 4, inclusive. This is the conventional means of securing metallic caps now in use, wherein a couple of nicks or dented notches are secured under these ridges R.

Due to the priorities on strategic metals needed in the war effort, this invention has been developed to provide a non-metallic cap or closure member that is efficient in use, economical in manufacturing costs, and can be satisfactorily used as a substitute for metallic caps heretofore employed.

Therefore, the tabs 15 formed in the bottom layer or ring member 14, must be made from tough and durable material, as these tabs 15 undergo a severe strain while being wedged under inclining ridges R, tending to open or rupture the intermediate layer 11 which therefore must be of tough material in order to prevent such an occurrence. A shoulder portion P on the jar is slightly below the ridges R, against which the tabs 15 will be wedged tightly. It is desirable that the parts be so proportioned that each tab 15 will engage in tight wedging relation with the corresponding inclined under surface T at a point thereof about one-third to one-half of the length of said surface from the near end thereof, or the end at which the tab enters, as clearly illustrated in Figures 1 and 4.

This novel non-metallic laminated closure structure is especially useful for commercial sizes of tobacco and similar jars which may be reused either for similar materials or for preserving fruits and other solid or liquid foods. Therefore, sealing means, such as a wax paper W, may be used as a gasket to keep the contents in jar J air and water-tight, as shown in Figure 8. In this embodiment two or more intermediate non-metallic layers 11 and 11a, depending on the space from the top opening of the jar to the locking ridges R, all of which may vary in certain types of jars. The sealing strip W is preferably held in its normal operative position as shown by means of its marginal portions extending in between the top closure disk 10 and the adjacent ring lamination 11.

The double intermediate layers 11 and 11a may allow the use of less tough board, and in such case the layers may be treated or glued together so the medial portion will not likely rupture or break open. Certain special treatments of the inexpensive paper-board may be adopted, if so desired, so as to provide the necessary toughness and durability of the laminated parts, and to prevent the opening up of the fibre portion, in which event, the single intermediate layer 11 may be substituted by two or more thinner layers, like 11a, so the layers will be solidified together in their glueing operation. Only the intermediate ring members 11, 11a, need the glueing, as the disk and bottom ring members 10 and 14 are mounted thereto.

It is to be noted that the rigid tabs 15 are on the same plane as the flat surfaces of the ring itself, and are not formed the same as the metal turned-in flanges for a similar purpose. It is quite obvious that the rigid tabs and ring 14 should be made of tough fibre-board, or similar material, as these projections 15 undergo considerable stress while being wedged under the inclining ridges R of the jar J, and should be interlocked or wedged against the ridges R at points thereof as above pointed out and as shown in Figure 4, so as to allow for a long continuous use, as when the tobacco jars are converted to other uses as above suggested. In production the disks 10, rings 11 and 14 are punched out of a large sheet by dies in one operation, and then assembled into their laminated formation as described.

It will be noticed that the integral attaching lugs 15 on the flat ring 14 are spaced horizontally along the inner edge of this ring, and that they are spaced downwardly a short distance from the top closure disk 10 as clearly seen in Figs. 1 and 2. Thus, when the closure cap is placed in closing position on the neck of the jar J as shown in Fig. 3, the lugs 15 enter in the spaces between the respective adjacent inclined attaching ridges R. When the lugs are thus entered, the entire closure cap is rotated slightly to cause the lugs to be respectively wedged against the under surfaces T of the ridges R.

Since certain changes may be made in the above construction and different embodiments of the invention could be made without departing from the scope thereof, it is intended that all matter contained in the above description or shown in the accompanying drawings shall be interpreted as illustrative and not in a limiting sense.

The invention having thus been fully described, the following is claimed:

1. In a closure for a container opening, in combination, a closure disk adapted to extend over the container opening to provide a closure therefor, an intermediate flat ring member, and a bottom flat ring member, a plurality of spaced rigid tabs arranged on the inner edge portion of and integral with said bottom ring member, said rigid tabs projecting inwardly in position for securing engagement with the container, all of said disk and ring members being integrally secured together in superposed relation to form a laminated closure structure, the inner surface of said laminated closure structure being suitably finished to make it water and air proof, and the exterior portion thereof being finished to simulate a one piece member.

2. In a closure for a container opening, in combination, a closure disk adapted to extend over the container opening to provide a closure therefor, a plurality of flat ring members in superposed relation, a plurality of projecting rigid tabs spaced apart on the inner edge portion of one of said ring members and spaced from said closure disk so as to be positioned for securing engagement with the container, said disk and ring members being secured together integrally to form a laminated closure structure, said closure structure being finished on the exterior and interior portions to conceal the laminations and provide water and air tight means, said tabs forming securing lugs adapted to be interlocked on inclining ridges of jars, and the like.

3. In a closure for a container opening, in combination, a closure disk adapted to extend over the container opening to provide a closure therefor, a plurality of flat rings having upper and lower contacting surfaces adhesively attached together and to said closure disk to form a laminated closure structure, and a plurality of inwardly projecting attaching tabs spaced along and integral with the inner edge portion of one of said flat rings that is spaced downwardly from said closure disk by one or more of said flat rings whereby said tabs are spaced downwardly from said closure disk so as to form lugs positioned for securing engagement with formations on the container for holding the closure in closing position.

4. In a closure for a container opening, in combination, a closure disk adapted to extend over the container opening to provide a closure therefor, a plurality of flat rings having upper and lower contacting surfaces adhesively attached together and to said closure disk to form a laminated closure structure, a plurality of inwardly projecting attaching tabs spaced along and integral with the inner edge portion of one of said flat rings that is spaced downwardly from said closure disk by one or more of said flat rings whereby said tabs are spaced downwardly from said closure disk so as to form lugs positioned for securing engagement with formations on the container for holding the closure in closing position, and a sealing member on the inner surface of said closure disk and having marginal attaching portions extending between the laminations of said closure structure for attaching it in position.

5. In a closure for a container opening, in combination, a closure disk positioned to extend over the container opening to provide a closure therefor, a flat ring firmly attached to said disk to form a laminated closure structure, a plurality of spaced inwardly projecting attaching tabs integral with the inner edge portion of said flat ring and spaced downwardly from said closure disk so as to form lugs positioned for automatic securing engagement with formations on the container upon relative movement of said closure structure for holding the closure in closing position, and a sealing member on the inner surface of said closure disk and having marginal attaching portions extending between the laminations of said closure structure for attaching it in position.

WILLIAM A. SMITH.